United States Patent [19]

Kowalics et al.

[11] Patent Number: 4,817,510
[45] Date of Patent: Apr. 4, 1989

[54] COOKING APPARATUS FOR FLUID CONTAINER

[75] Inventors: Raymond P. Kowalics, Solon; Kenneth C. Sidoti, Maple Heights; Richard L. Beery, Shreve, all of Ohio

[73] Assignee: The Meyer Company, Cleveland, Ohio

[21] Appl. No.: 888,849

[22] Filed: Jul. 22, 1986

Related U.S. Application Data

[63] Continuation-in-part of Ser. No. 849,780, Apr. 9, 1986, abandoned.

[51] Int. Cl.⁴ .............................................. A47J 27/62
[52] U.S. Cl. ........................................ 99/331; 99/332; 99/335; 99/348; 126/374; 126/387; 426/523
[58] Field of Search ................. 99/331, 332, 334, 335, 99/342, 344, 348; 219/432, 433, 436, 438, 441, 442, 497; 366/101; 426/231, 523; 126/387, 374, 388

[56] References Cited

U.S. PATENT DOCUMENTS

| | | | |
|---|---|---|---|
| 1,498,084 | 6/1924 | Finney | 99/348 |
| 1,941,580 | −1/1934 | Rosellini | 126/374 |
| 2,700,723 | 1/1955 | Lynch, Jr. | 99/332 X |
| 3,332,338 | 7/1967 | Wein | 99/331 X |
| 4,048,473 | 9/1977 | Burkhart | 99/331 X |
| 4,465,228 | 8/1984 | Mori et al. | 126/374 X |
| 4,585,925 | 4/1986 | Andre | 99/335 X |
| 4,682,012 | 7/1987 | Wolf et al. | 99/332 X |

FOREIGN PATENT DOCUMENTS 2535598 5/1984 France .................................. 99/332

Primary Examiner—James Kee Chi
Attorney, Agent, or Firm—Fay, Sharpe, Beall, Fagan, Minnich & McKee

[57] ABSTRACT

A cooking apparatus includes a recessed area adapted to receive an associated fluid container for cooking soup and similar food products. Means for heating the recessed area as well as insulating means therearound minimizes heat loss and effectively heats the fluid container. Means for mixing the soup held in the container preferably includes an air pump and a flow passage disposed between the base and the container. Means for sensing the temperature in the fluid container is coupled with a control means for monitoring the soup temperature and, in response, controlling the heating means. Various timing means provide an automated cooking cycle which reduces the soup temperature to a lower temperature after cooking for a preselected time period, and actuates an indicating means for either automatic or manual shutoff.

14 Claims, 8 Drawing Sheets

COOKING APPARATUS FOR FLUID CONTAINER

BACKGROUND OF THE INVENTION

This application is a continuation-in-part of copending application Ser. No. 849,780 filed Apr. 9, 1986 now abandoned.

This invention pertains to the art of fluid containers and more particularly to electrically heated soup kettles and cookers and the like.

The invention is particularly applicable to soup kettles having institutional application such as in restaurants, schools, cafeterias, and the like and will be described with particular reference thereto. However, it will be appreciated that the invention has broader applications and may be advantageously employed in other environments and applications.

Soup kettle apparatus have heretofore been comprised of a thick, earthenware pot, jar, or container adapted for operative engagement with a heating element. Oftentimes, the container is of generally cylindrical configuration and is inserted into a concentric housing for continuous heating of the container exterior by the heating element. The heating element is typically controlled by a simplified on/off switch or, alternatively, a high/low switch for supplying high and low power, respectively, to the heating element. In still other soup cooking apparatus, an adjustable electric heating element is incorporated in conjunction with a thermostate for maintaining a predetermined temperature. Soups, stews, and similar food products are placed in the earthenware jar and left to cook over extended periods of time.

Generally speaking, these prior soup kettle apparatus have met with some success but are limited in their cooking capabilities. That is, the soup kettles are designed primarily as a food warmer. Products are first cooked and then transferred hot to the kettle for serving. Therefore, two separate apparatus are required for cooking and serving.

There are, as indicated, cooking apparatus for fluid-type foods such as soup, chili, stew, or the like. These cooking apparatus are also of limited complexity and require frequent tending. For example, if left unattended for an extended period of time, the fluid or food mixture contained therein may be brought to a boil or become overcooked. In an effort to promote more uniform cooking, it is necessary for a user to periodically tend to the food. Occasional stirring or regulation of the heating element in order to promote more uniform cooking enhances the flavor of the food product. If mechanical stirring is provided, such as by a propeller-like mixing blade, a servere problem with abrasiveness and deleterious agitation of the fluid mixture may result.

As is apparent, the prior cooking apparatus are extremely limited in use. Basically, the ingredients are measured and placed in the container and the heating apparatus actuated. Periodic stirring or tending is required to assure uniform cooking of the entire container's contents. Once the cooking time period has expired, the heating assembly is turned off and the food is removed for consumption.

It has been considered desirable to provide a structure which regulates the cooking process in a more efficient and precise manner. Specifically, adjustment of the heating element to prevent overcooking or boiling or, on the other hand, undercooking the food, is desired. Additionally, means for mixing the food in the container is desirable so that the food may be left unattended and, be assured of uniform cooking, without doing damage to the mixture.

The subject invention is deemed to meet these needs and overcome the above-noted problems and others in a simple, economical manner.

SUMMARY OF THE INVENTION

The present invention contemplates a new and improved cooking apparatus.

According to the present invention, the apparatus includes a first recessed area adapted to receive a fluid container and including a means for heating the recessed area. Insulating means are provided adjacent the first recessed area to minimize heat loss therefrom. Air is supplied to the associated fluid container for mixing purposes.

According to another aspect of the invention, preheating means are provided for preheating the air prior to introduction into the associated fluid container.

According to a further aspect of the invention, sensing means are disposed in the fluid container for monitoring the temperature therein.

According to yet another aspect of the invention, a processing means controls the heating means and includes timer means for altering the heating means actuation.

The principal advantage of the subject invention is provided in a cooking apparatus that automates the cooking cycle.

A further advantage of the invention resides in the enhanced flavor of the food provided by air injection mixing.

A further advantage is presented by the use of air as a mixing means, whereby deleterious abrasive effects which are resulted from mechanical mixing means are avoided.

Another advantage of the invention resides in the automated monitoring of the fluid temperature and resultant control of the heating apparatus.

Still other advantages and benefits of the invention will become apparent to those skilled in the art upon reading and understanding the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein.

DETAILED DECRIPTION OF THE PREFERRED EMBODIMENT

Figure 1:
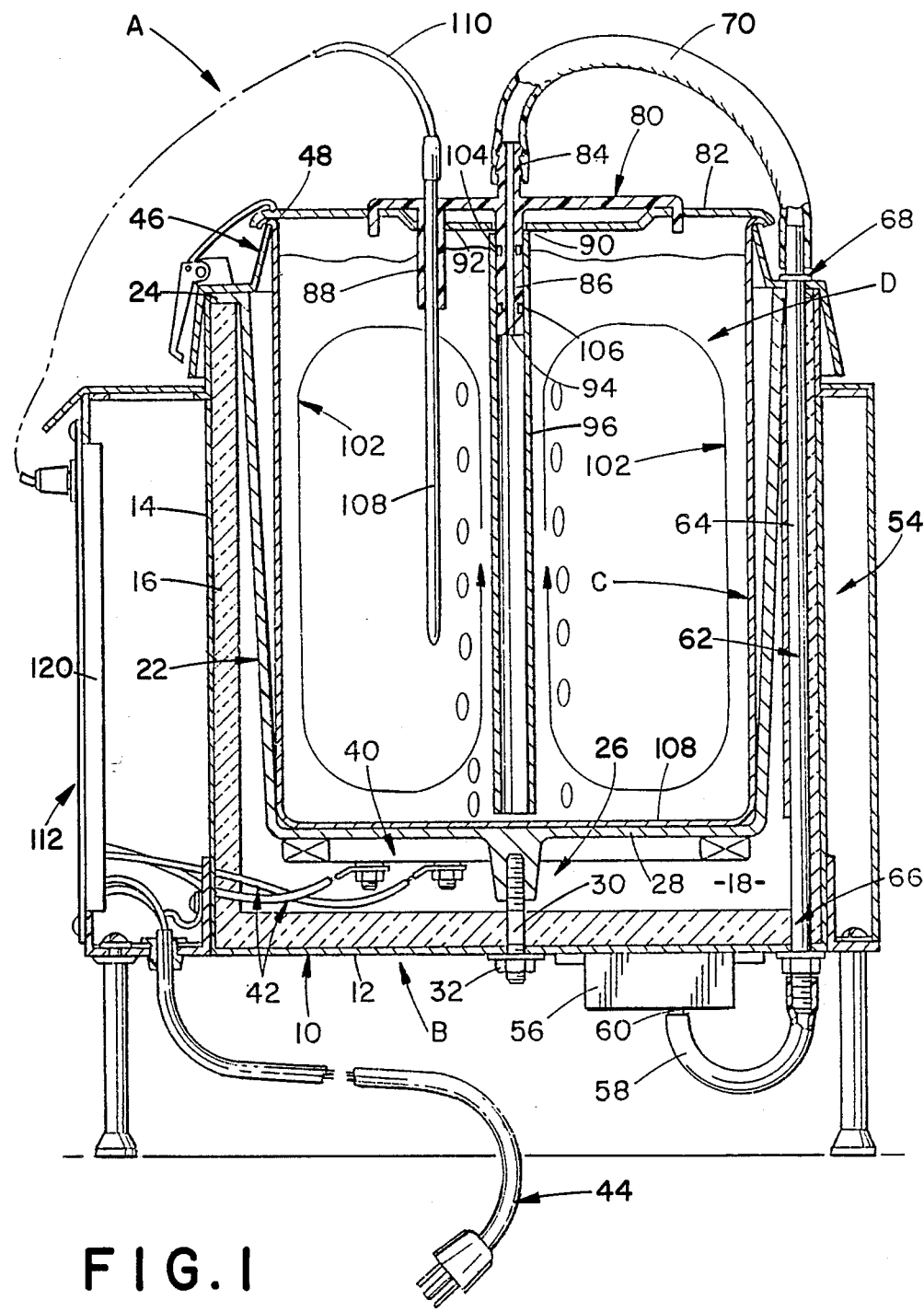
FIG. 1 is an elevational, cross-sectional view of the cooking apparatus in accordance with the subject invention.

Referring now to the drawings wherein the showings are for purposes of illustrating the preferred embodiment of the invention only and not for purposes of limiting same, FIG. 1 shows a cooking apparatus A comprising a main body or base portion B receiving a removable fluid container C therein. Within the fluid container C is illustrated fluid D which may comprise soup, chili, or the like. More specifically, the base portion B includes a housing 10 having a base wall 12 and sidewall 14. The sidewall may be formed from a plurality of distinct wall portions or, in the preferred embodiment, is a generally continuous member of generally cylindrical configuration. An insulation means or lining 16 extends along an interior wall of the housing. The insulation lining has a predetermined thickness in order to retain heat within a central cavity 18 defined by the housing. Various types of insulation may be used as long as they sufficiently inhibit heat transfer outwardly from the housing as will become more apparent hereinbelow.

An insert 22 defines a recessed area in housing 10 and the insert is retainingly held in the cavity 18 defined by the housing. The insert is of generally cylindrical configuration and, in the preferred embodiment, is formed from aluminum or other durable, heat-conductive material. A radially outwardly extending rim portion 24 is defined along the periphery of the insert at its upper end and is designed for mating relation with the sidewall 14 of the housing. The insert is spaced radially inwardly from the insulation lining generally along its axial length so that cavity 18 is generally continuous therebetween. A mounting means 26 is defined at a base wall 28 of the insert and is adapted to fixedly retain the insert in spaced relation from wall 12 of the housing. As shown, the mounting means 26 comprises an elongated, threaded stud 30 extending from the insert, through the insulation lining 16, and outwardly through the housing base wall 12. An appropriate washer and nut assembly 32 cooperates with the threaded stud to retain the insert in a fixed, spaced relation relative to the housing.

A heating means 40 is positioned in the cavity 18 adjacent the base wall 28 of the insert. The heating means is typically an electrically actuated heating element or coil that evenly distributes the heat along base wall 28. A pair of lead lines 42 extend from the heating means for operative connection with a power source such as through male electrical plug 44.

The removable, fluid impervious container C is also of generally cylindrical configuration and adapted for close receipt within the insert 22. The fluid container is normally of stainless steel construction and, as shown, rests in abutting engagement with base wall 28 of the insert. The fluid container is designed to hold soups, chili, or similar food products therein through a predetermined cooking cycle and maintain the food products at a serving temperature. A shroud assembly 46 extends over the insert and housing sidewalls for mating engagement with a peripheral lip portion 48 of the fluid container. The shroud assembly positions the fluid container in concentric relation with the insert and prevents entry of foreign matter therebetween.

A mixing means 54 extends between the base portion B and the fluid container C for mixing the soup retained therein. The mixing means includes a means for compressing air such as air pump or compressor 56. The air pump is fixedly mounted along the base wall 12 of the housing and, in the preferred embodiment, includes a first flexible tube or passage 58 extending from a pump outlet 60 to a preheating means 62. Though preheating the air is not mandatory, an added advantage of more rapid and uniform soup heating is realized through its implementation.

To effectuate preheating of the air, the preheating means is received in cavity 18 and interposed between the insulation lining 16 and insert 22. Preferably, the preheating means includes an elongated passage or tube 64 formed of copper, brass, or similar heat-conductive material and designed to readily transfer heat from the cavity 18 to the compressed air flowing through passageway 64. A first end 66 of the elongated passage extends outwardly through the housing base wall 12 and operatively receives the other end of flexible tube 58 thereon. A second end 68 of the passageway extends outwardly from the upper portion of housing 10 adjacent the insert rim portion 24. A second flexible tube or passage 70 extends from the passage second end 68 to a probe holder 80.

The holder 80 is centrally disposed in a fluid container lid 82 and is shown in press-fit relation therewith, although other arrangements can be used with equal success. A nipple 84 extends outwardly from one face of the probe holder and is adapted for sealing relation with the flexible tube 70. First and second tubular portions 86, 88 extend from the opposed face of the probe holder and are received through openings 90, 92, respectively, in the container lid. The first tubular portion 86 is aligned with nipple 84 and a passage 94 defined therethrough. Further, the tubular portion 86 is received in an elongated central passage 96 disposed on an inner face of the container lid. A pair of spaced seal rings 104, 106 provide a tight, sealing fit between the tubular portion 86 and central passage 96.

The elongated central passage 96 extends from the lid 82 to an area adjacent a bottom portion 108 of the fluid container C. The lower end of central passage 96 defines the outlet for the compressed air supplied by pump 56. As is apparent, mixing means 54, specifically pump 56, compresses filtered air that is emitted at outlet 60, passes through first flexible tube 58, and into the preheating means 62. The tubular passage 64, as indicated above, is formed of a thermally conductive material to warm the air as it passes upwardly to second end 68. The air then continues through second flexible tube 70, through the probe holder passage 94 to elongated central passage 96, and exits along the base of fluid container C.

The central location of the elongated passage outlet is disposed at the bottom of the fluid container to promote better mixing and more uniform cooking of the soup contained therein. The mixing means provides a bubbling action that is dispersed along the base of the container and flows upwardly to the surface of the soup. This bubbling action is similar, in effect, to a slow stirring action.

As illustrated, the bubbling induces fluid flow upward at generally the center of the fluid container C. This provides a generally toroidal flow of the fluid as indicated by the flow line 102. Such a fluid path tends to most uniformly expose all fluid to the effect of heating means 40 during a heating procedure.

A sensing means such as a probe 108 is also received in the probe holder 80 through second tubular portion 88. A suitable probe means is found in the Series 53-1 and 53-3 thermocouple probes of Fenwal Incorporated of Ashland, Mass. Such probes function to vary a current output to be indicative of a temperature exposure. The probe extends into the soup in the fluid container and monitors the temperature therein. A lead line 110 denotes a path from the probe for operative communication with a control box 112. The control box is mounted on the exterior of the cooking assembly housing 10 and is protected from deleterious effects of the heat by insulation lining 16. The control box includes a control means 120 comprising circuitry adapated to receive input commands and signals and process them for a corresponding predetermined output function. The control means 120 regulates the power supplied through electrical plug 44 and varies the output to lead lines 42 and, subsequently, heating means 40 according to a predetermined program. The probe 108 monitors the temperature of the soup so that adjustments can be made to the power supplied to heating means 40.

Figure 2:
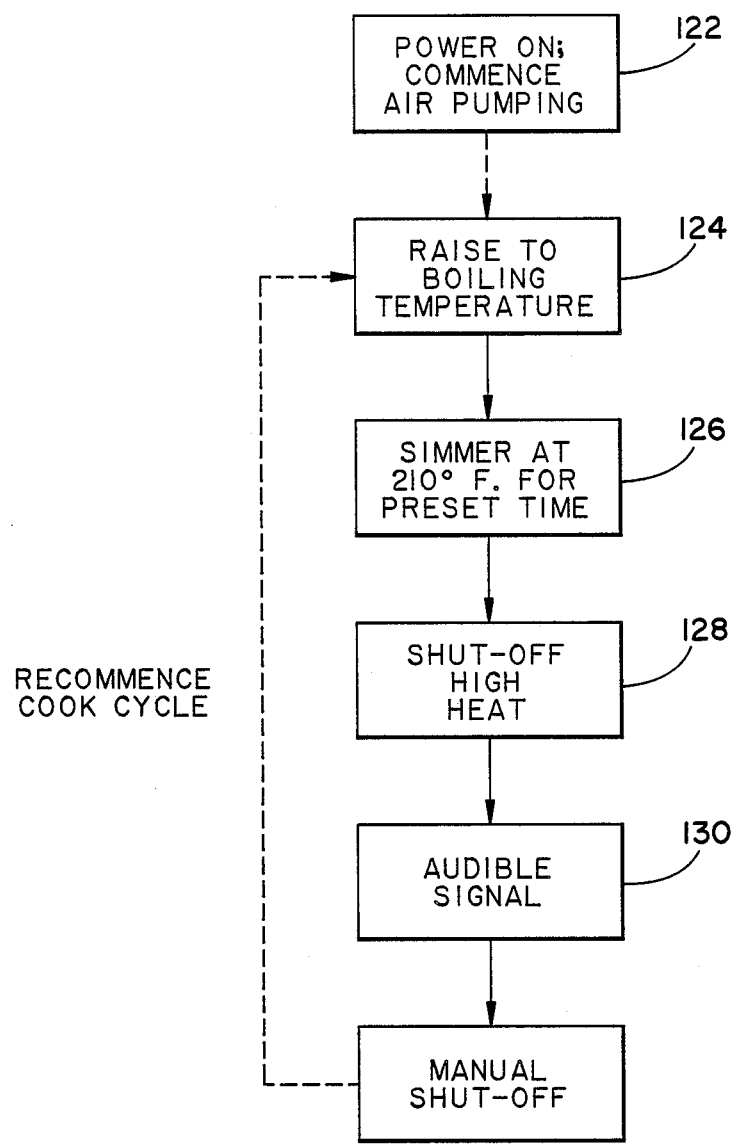
FIG. 2 is a block diagram of a cooking cycle in accordance with the subject invention.

According to the control means 120, as represented by the flow chart illustrated in FIG. 2, an on/off switch supplies power to the apparatus. Once the food has been placed in the fluid container which, in turn, is positioned in the cooking apparatus A, a user actuates the on/off switch to supply power thereto as generally represented by step 122. An indicator means such as a light may give ready visual indication that power is being supplied to the apparatus. Preferably, the air pump 56 is actuated in this initial step 122. Once power is supplied, a cycle switch is actuated in step 124 to provide high power to the heating means 40. Typically, the heating means will bring the soup up to a temperature just below boiling.

The probe continuously monitors the soup temperature and provides a feed back signal by which the heating element 40 may be selectively enabled to achieve a preselected temperature. Once a predetermined temperature is reached a first timer is switched on allowing the soup to simmer and cook for a preselected time period, typically at a somewhat lower temperature 126. After cooking for the duration of the timer, the high power is shut off as indicated by block 128. Once the timing means has expired, an indicator means such as a horn or light can signal that the cooking cycle is over if desired. A manual shutoff may be performed as indicated by block 132, after which time the cycle may be recommended.

Once the power is actuated to the apparatus, the air pump 56 is actuated and continually mixes the fluid or soup D in the fluid container C. Therefore, as described above, a more uniform cooking of the soup is attained which, in turn, provides a more flavorful soup. The probe 108 continually monitors the soup temperature and the control means 120 makes the needed adjustments to the heating means 40 as required.

Figure 3:
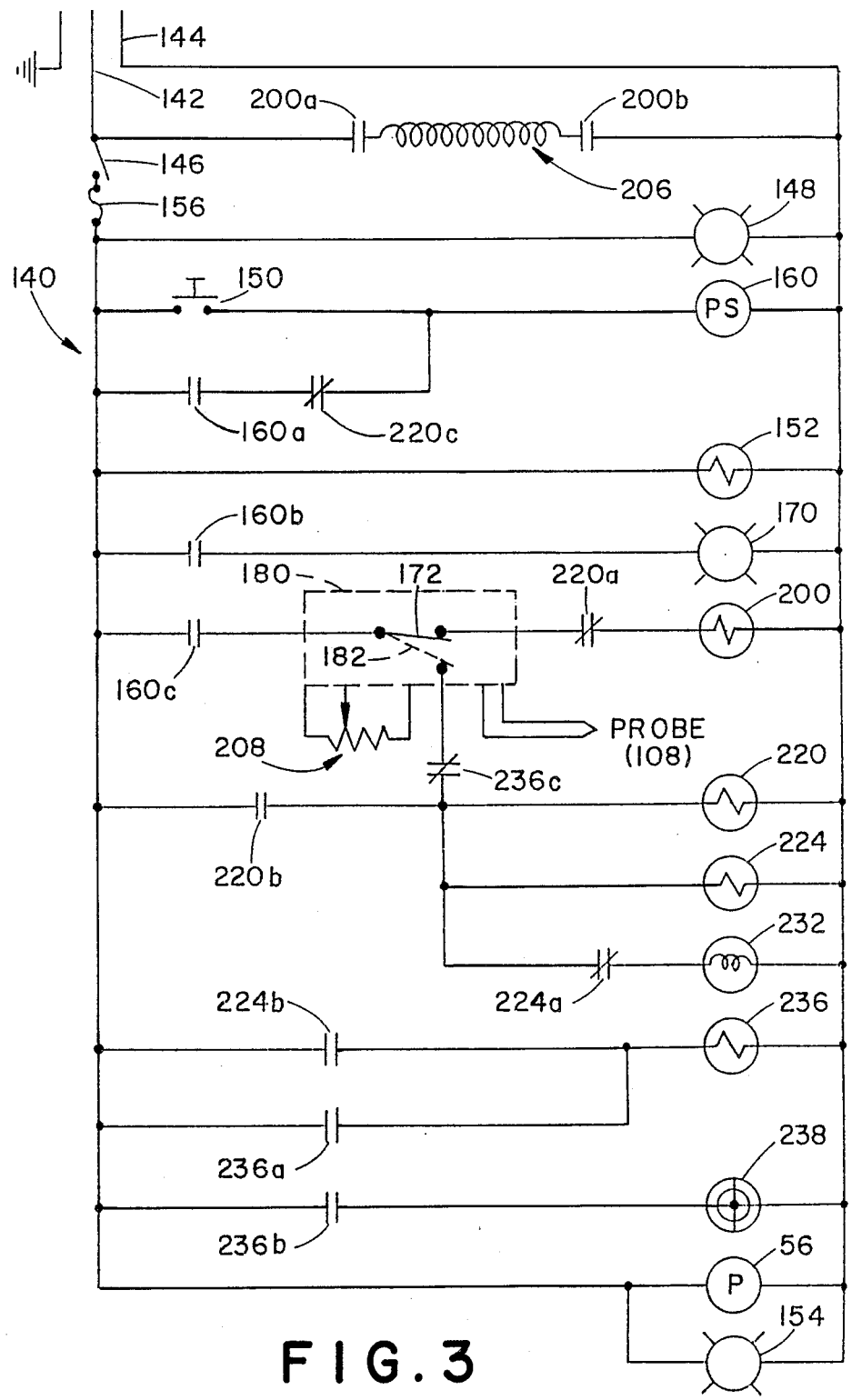
FIG. 3 is a schematic representation of an electrical circuit in accordance with the cooking cycle of FIG 2.

Turning now to FIG. 3, an electronic circuit for accomplishing the above soup cooking process will be described. The control circuit 140 has power input lines 142 and 144 at complementary voltage potentials. For ease of illustration, in the description below, coils for relays will be assigned a reference numeral, and a corresponding contact pairs of the coil will be assigned a letter subscript to the coil numeral. The operation of the timer circuit is commenced by closing switch 146. At this time, a circuit will be completed through indicating means such as pilot light 148. Pilot light 148 will remain actuated as long as the circuit 140 is enabled, that is, as long as switch 146 is in a conducting position. At the closing of switch 146, power is presented to a power supply 152 for a thermostatic control 180, the operation of which will be described below. Switch 146 also commences operation of the mixing means 54 (FIG. 1), which is illustrated as an air pump 56. An air pump indicator pilot 154 may provide an indicator of the activation of the pump. A fuse 156 is preferably provided as a safety device in the event of a short circuit during the activation of the circuit 140.

A cooking cycle is activated by depression of normally-opened switch 150 which is depicted as a push button type switch. Of course, comparable switches can be used with equal success without departing from the scope and intent of the subject invention. Actuation of the switch 150 supplies power to relay coil 160 (see 122, FIG. 2), thereby causing contacts 160a, 160b, and 160c to close. Electrical conduction through the contacts 160a maintains power to the coil 160 after the switch 150 is released. Conduction through contacts 160b causes thermostatic control indicator, such as pilot lamp 170, to be activated. Electrical conduction through contacts 160c provides power to normally-closed contact 172 of thermostatic control 180. The thermostatic control 180 may be comprised of a control such as a Fenwal series 544 thermocouple sensing temperature controller. The control 180 derives its operation power from the aforenoted power supply 152. Such a device incorporates a means for monitoring the output of a sensor such as probe 108, and to provide a control in accordance with the temperature thereat. The control 180 is adapted to function in conjunction with a variable resistor or potentiometer, the setting of which determines the maintained heat level.

When the thermostatic control 180 is in the closed position indicated at 172, a current path is present to a contactor coil 200. Energizing the coil 200, closes contacts 200a and 200b, thereby supplying power to a high heat unit which comprises a portion of heating means 40 (FIG. 1). The high heat unit 206 preferably is disposed below the removable fluid container C for heating the soup in accordance with the above-description. The high heat unit 206 has sufficient wattage to heat the soup at a rate of approximately 3° F. per minute. Upon reaching a preselected temperature, preferably just prior to the boiling point of the soup, which is generally assumed to be approximately 212° F., thermostatic control 180 switches from its closed position 172 to its open position indictated at 182. If the cooker is sufficiently well insulated, it may be desirable to terminate the high heat substantially prior to the boiling point, in that the temperature may continue to rise from residual heat in the coils and the cooker itself. A potentiometer 208 is provided in conjuction with thermostatic control 180 to allow for varying the temperature at which the state of the thermostatic control will change from its normally closed position at 172, to its normally open position at 182. Such an ability is desirable when the boiling point of the soup is varied due to such conditions as the altitude of the cooker, or the contents of the soup being prepared. The thermostatic control functions to compare signals received from the probe 108 (FIG. 1) to the setting of potentiometer 208.

When the thermostatic control 180 switches from its closed position 172 to its open position indicated at 182, a current path is completed to relay coil 220. At this time the contacts 220a are open, removing power from high heat contactor coil 200 thereby opening contacts 200a and 200b. The contacts 220b are also closed, thereby sustaining power to the coil 220. Contacts 220c are also opened, which removes power from the coil 160. Deactivation of the relay coil 160, removes power from the pilot light 170, by the opening of contacts 160b, and the thermostatic control 180 by the opening of contacts 160c. The entire high heat portion of the circuit is thereby disenabled.

The current path through contacts 220b supply power to a time delay relay coil 224, which is well known in the art. The time delay relay coil 224 functions to maintain its initial state for a preselected duration. While in its initial state, contacts 224a are closed, thereby supplying power to a low heat unit 232. The wattage of the low heat unit 232 is chosen so as to maintain the soup at a temperature generally 3° to 5° F. below the boiling point.

After the tolling of the preselected duration of the time delay relay 224, the contacts 224a open, thereby removing power to the low heat unit 232. At this time, contacts 224b are closed, supplying power to a relay coil 236. Energizing the coil 236 closes contacts 236a, which thereby sustain power to the coil 236. At this time also, contacts 236b are closed supplying power to an alarm, such as an audible signal which is generally indicated at 238. Contacts 236c are opened removing power to the entire low heat portion of circuit 140. The alarm will continue to be activated until the switch 146 is opened, at which time the control circuit 140 is read for recommencement of the above-described cycle.

Figure 4:
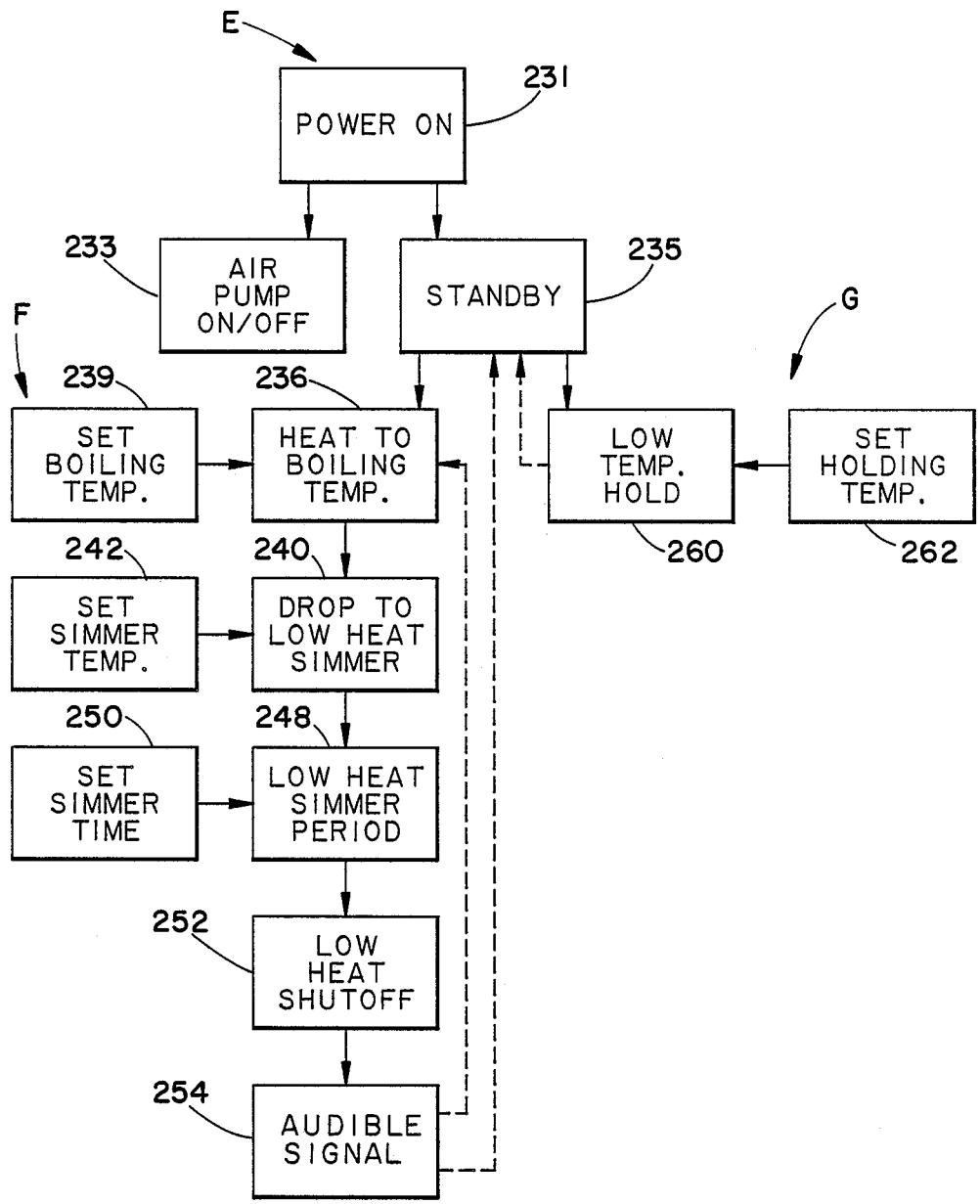
FIG. 4 is a block diagram of an alternative cooking cycle of the subject invention.

The alternative control circuitry illustrated in FIGS. 5 through 8 allows for improved cooking performance and a resultant, better tasting and more uniform product. Turning to FIG. 4, a flow chart is presented which demonstrates a modified cooking process, which, in conjunction with a cooker formed in accordance with the subject invention presents more desirable results.

FIG. 4 includes a power up cycle, generally indicated at E; a cooking cycle, generally indicated at F; and a holding cycle, generally indicated at G. Placing power on to the cooking control of FIG. 4 places the cooking apparatus in a power on state indicated as block 231. From this state, the mixing means, which may be an air pump as indicated by block 233, may be selectively activated or deactivated. The power on state also places the control circuitry of FIG. 4 in a standby mode as indicated at block 235. From this point a cooking cycle F, or a holding cycle G, may be commenced.

Commencement of the cooking cycle F, begins heating of fluid in the container C (FIG. 1), as indicated by block 236. At this point, fluid is heated to at or or just below, a preselected boiling temperature which is set as indicated generally at block 239. Upon reaching this preselected temperature, the control cycle enters the phase indicated at block 240, where the applied heat is dropped to a achieve lower, simmer temperature in the fluid, which has been selected at 242. At this stage, a lower heat simmer period is maintained at 248, during which time the temperature of the fluid is continually monitored, and a heating element selectively engaged or disengaged to maintain generally the constant simmer temperature. The low heat level is achieved by turning the heating element on and off at generally uniform intervals. Thus, the simmer cycle includes two means by which the heating element may be selectively engaged and disengaged, as will be further described below.

The simmer period extends for a preselected time, which has been set at the block indicated at 250. After the tolling of the preselected simmer time, during which the temperature has been monitored and a heating means operating at a lower heat level has been selectively engaged to generally maintain the uniform simmer temperature, the heating element is turned off as indicated at block 252, and a signal, such as an audible signal as indicated at block 254 is given. From this state, an operator has the option of recommencing a cooking cycle by again taking the control to the point indicated at block 236, or again placing the control in a standby mode as indicated by block 235.

When in the standby mode of block 234, an operator has the option of holding the contents of the apparatus at a holding temperature, which is indicated generally at block 260. The holding temperature is preselected as indicated at 262. The preselected holding temperature at 262 is compared to a monitored temperature of the fluid and the heating element is selectively engaged or disengaged to maintain generally the preselected holding temperature. The holding temperature by be maintained indefinitely, as long as power remains to the system, until the operator again selects to place the apparatus in the standby mode 235.

Figure 5:
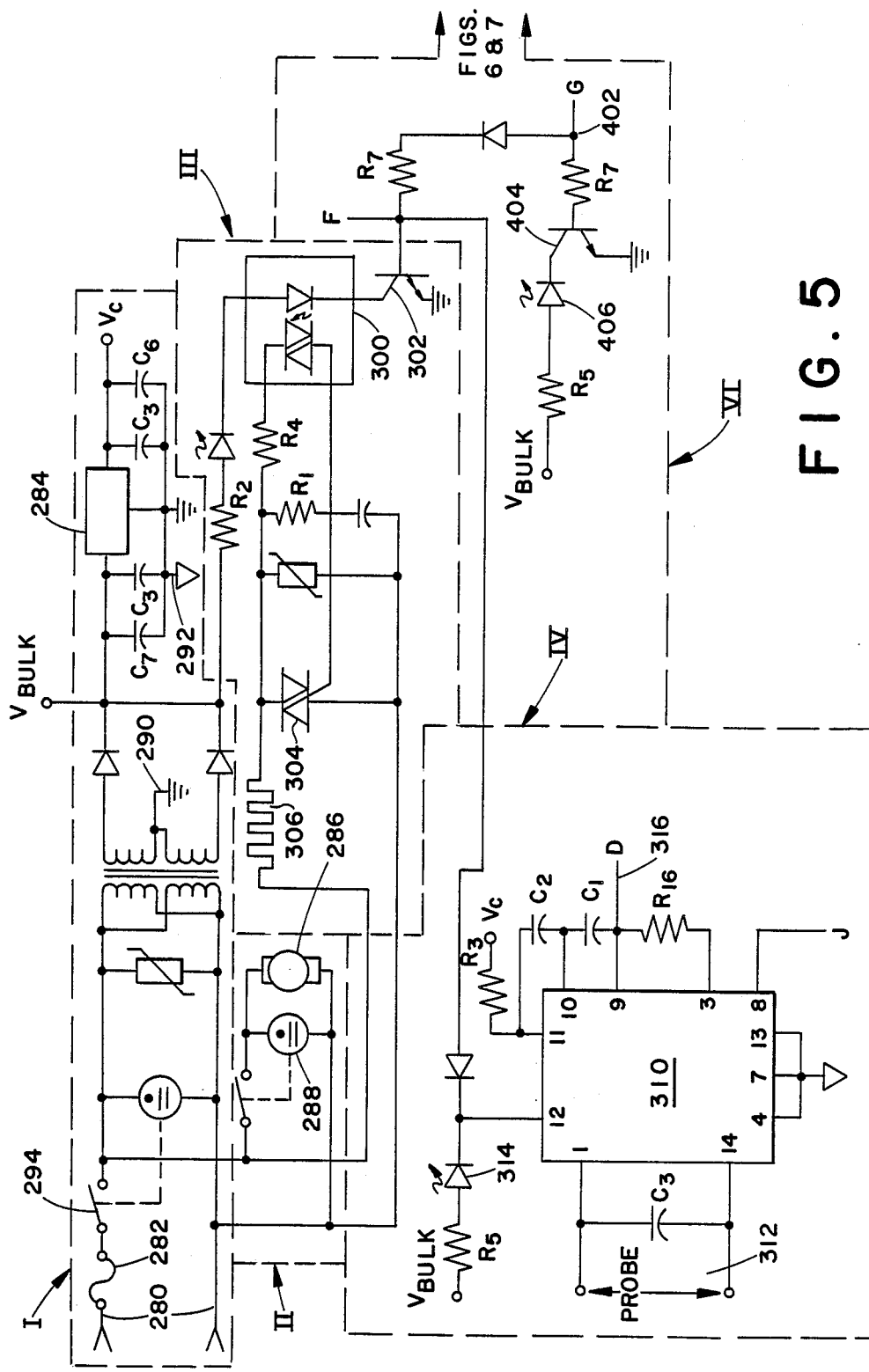
FIG. 5 is a schematic representation of a portion of a circuit to accomplish the operation represented in FIG. 4.

Turning now to FIGS. 5–8, a circuit for accomplishing the functions indicated at FIG. 4 will be described. Turning particularly to FIG. 5, a power supply I receives ac power at its terminals 280, through a fuse, and subsequently a power supply, the operation of which is well understood in the art. Two voltages are provided from the power supply I. A $V_{bulk}$ is provided, generally in the range of 9–12 volts. A second voltage, $V_c$, is provided generally at 5 volts, set by the voltage regulator 284. The level of $V_c$ is that which is generally desirable for powering integrated circuits of the TTL variety, or the like, although it is to be appreciated that for various integrated circuit types such as CMOS, varying power levels of $V_c$ may be desired. Two ground levels are indicated, with a common ground indicated by the symbol illustrated at 290, and an analog ground illustrated by the symbol at 292. The analog ground is isolated from the common ground to eliminate action of sensitive components which may react to transients should one ground be used for both.

A pump mechanism is indicated generally at II where a mixing means or pump 286 is activated by a relay/starter 288.

A heater control circuit is indicated generally at III and includes an optically isolated triac driver 300 which is controlled by a control means 302. A suitable triac driver is a common component such as a model M03030. Activation of control means 302, which is shown as a transistor darlington pair, enables an LED contained within the triac driver 300, thereby engaging a thyristor therein. Corresponding circuitry thereby engages a triac 304, activation of which enables heater coil 306 which is preferably comprised of a 1800 watt heating element. Selectively supplying power to a base of transistor 302 will selectively engage or disengage heater coil 306. Therefore, the application of heat to the fluid in the container C may be regulated to achieve a desired average temperature, by controlling the running period of the coil 306.

Turning now to block IV, circuitry is provided which functions as a thermocouple monitor. The integrated circuit 310 is a monolithic thermocouple amplifier, the pin outs of which are numbered in accordance with a common circuit designation AD594. Integrated circuit 310 is a complete instrumentation amplifier and thermocouple with cold junction compensation. It functions to combine an ice point reference with a precalibrated amplifier to produce a high level (10 mV/°C.) output directly from a thermocouple signal. The integrated circuit 310 also includes a failure alarm that indicates if one or both thermocouple leads become open. The thermocouple probe is placed across terminals 312.

A failure or fault such as a broken thermocouple causes a signal at pin 12 of integrated circuit 310, and results in the engaging of a fault indicator 314, which is shown as a light emitting diode (LED).

An output at pin 9 bears generally one of two states, dependent upon whether a temperature at the probe is above or below a preselected set point. More precisely, a temperature control signal at 316 is low when a monitored temperature of the probes is below a preselected set point, and the temperature control signal at 316 is high when the monitor temperature at the probes is greater than a preselected set point. The set point is determined by an input at pin 8 of integrated circuit 310, the obtaining of which will be described below.

Figure 8:
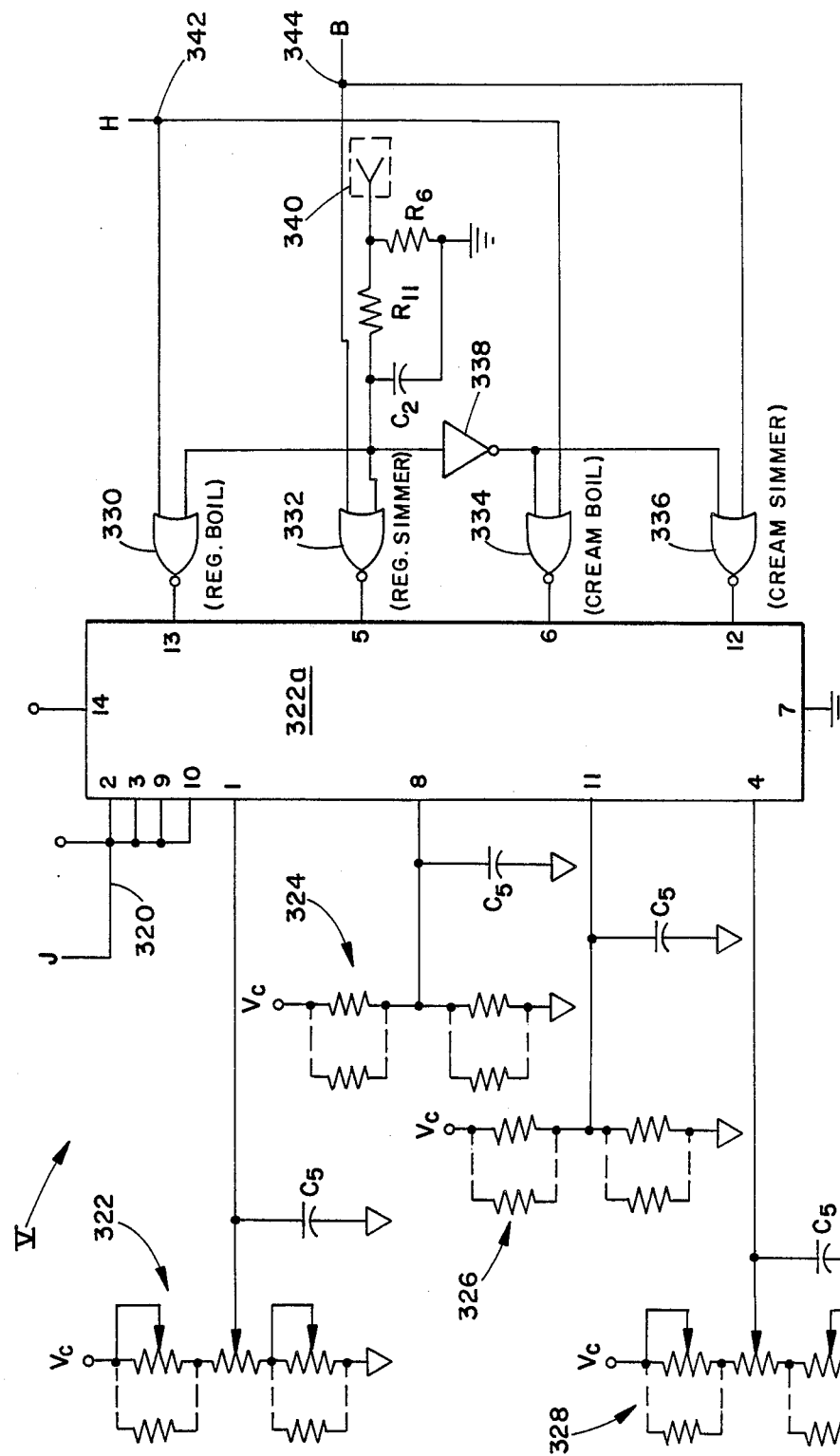
FIG. 8 is a continuation of the schematics of FIGS. 5, 6, and 7.

Turning now to FIG. 8, the means $V_c$ for generating the above-noted set point will be described. The preset set point indicated above is generated at line 320. The integrated circuit 322 bears corresponding pin outs for a quad analog switch/quadmultiplexer, such as an MC 14001 BCP, as is commonly known in the art. Pins 2, 3, 9, and 10 form outputs for a plurality of four respective analog switch/quadmultiplexers. In this instance, all outputs thereof are ORed together so that a signal at either output generates a corresponding signal at 320. Pins 1, 4, 8, and 11 are switched inputs corresponding to the outputs 2, 3, 9, and 10 respectively. Control signals are provided at pins 13, 5, 6, and 12 in the same order. For example, a signal placed at pin 13 will correspondingly engage pins 1 and 2.

A plurality of variable resistor networks 322, 324, 326 and 328 govern the preselected set point temperature with which the probe inputs may be compared, as indicated by block 5 of FIG. 4, and as illustrated above. Resistor network 322 dictates a set point for a regular boil sequence. Resistor network 324 dictates a set point for a cream boil sequence; cooking parameters being variant for cooking of cream base soups. Resistor network 326 dictates a set point for a cream simmer sequence. And, resistor network 328 dictates a set point for a regular simmer sequence. Hence, a signal placed at the output of NOR gate 330 enables a set point for a regular boil temperature to be maintained, a signal at the output of NOR gate 332 enables a set point for a regular simmer temperature to be maintained, a signal at the output NOR gate 334 enables a set point for a cream boil temperature to be maintained, and an output at NOR gate 336 enables a set point for a cream simmer temperature to be maintained.

NOR gates 330, 332, 334, and 336 will have an output thereon only at which time both inputs of any one thereof are at a low or zero state. It may be noted that the regular boil and simmer NOR gates 330 and 332 have one input thereof at an opposite state to corresponding inputs to NOR gates 334 and 336, as dictated by the operation of inverter 338. A $V_c$ signal at connector 340 will therefore dictate whether a cream cycle or a regular cycle is to be implemented. The connector 340 is engaged to a cream soup selector switch which will be tied to $V_c$ to select cream soup parameters.

The remaining inputs for NOR gates 330 and 334 are commonly connected to a point 342 a signal at which enables a boil cycle, either cream or regular to occur. Similarly, the remaining NOR gates 332 and 336 share a common connection at point 334, a signal at which enables a simmer cycle to progress. These signals at 342 and 344 will be obtained as further described below.

Figure 6:
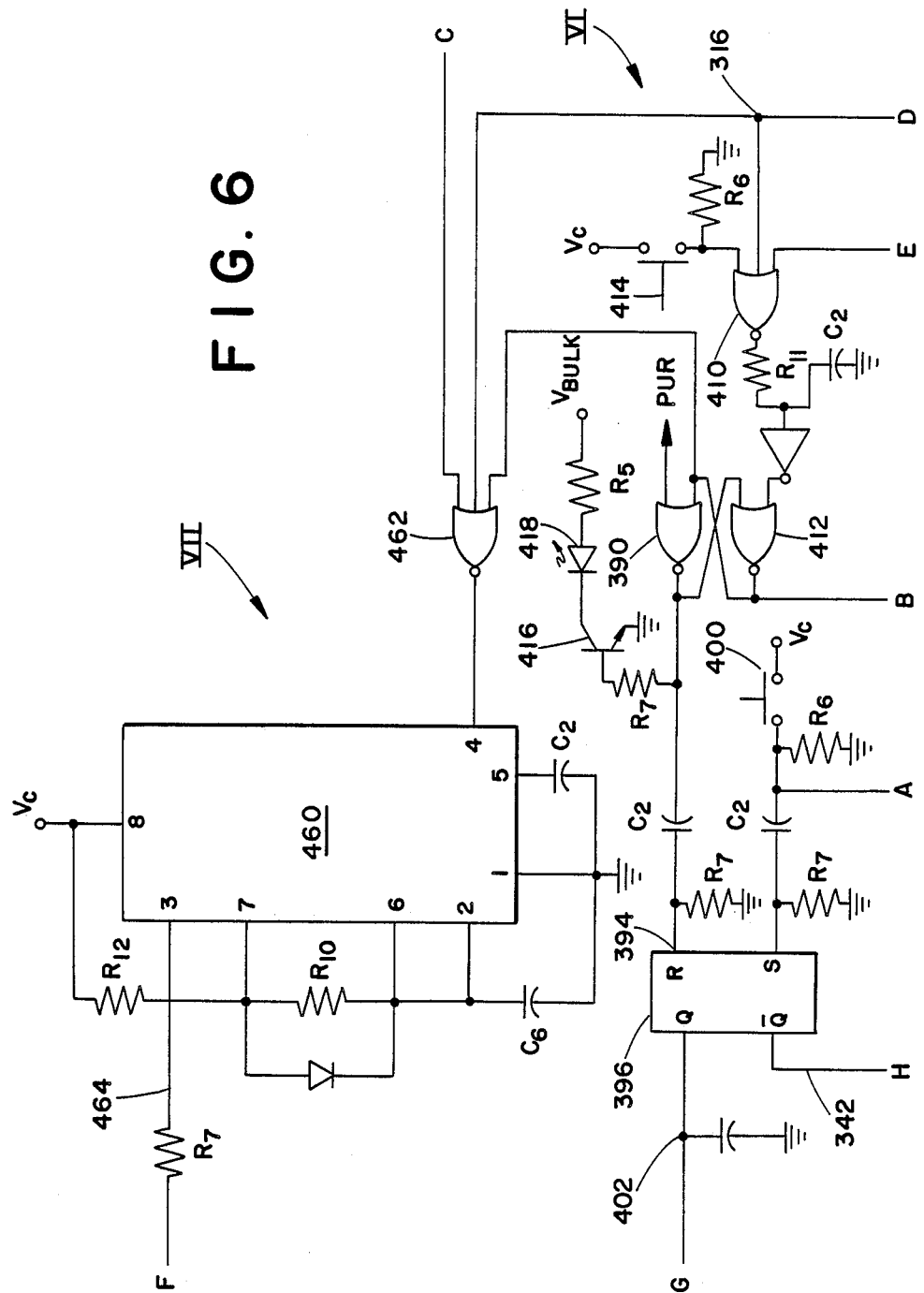
FIG. 6 is a continuation of the schematic of FIG. 5.
Figure 7:
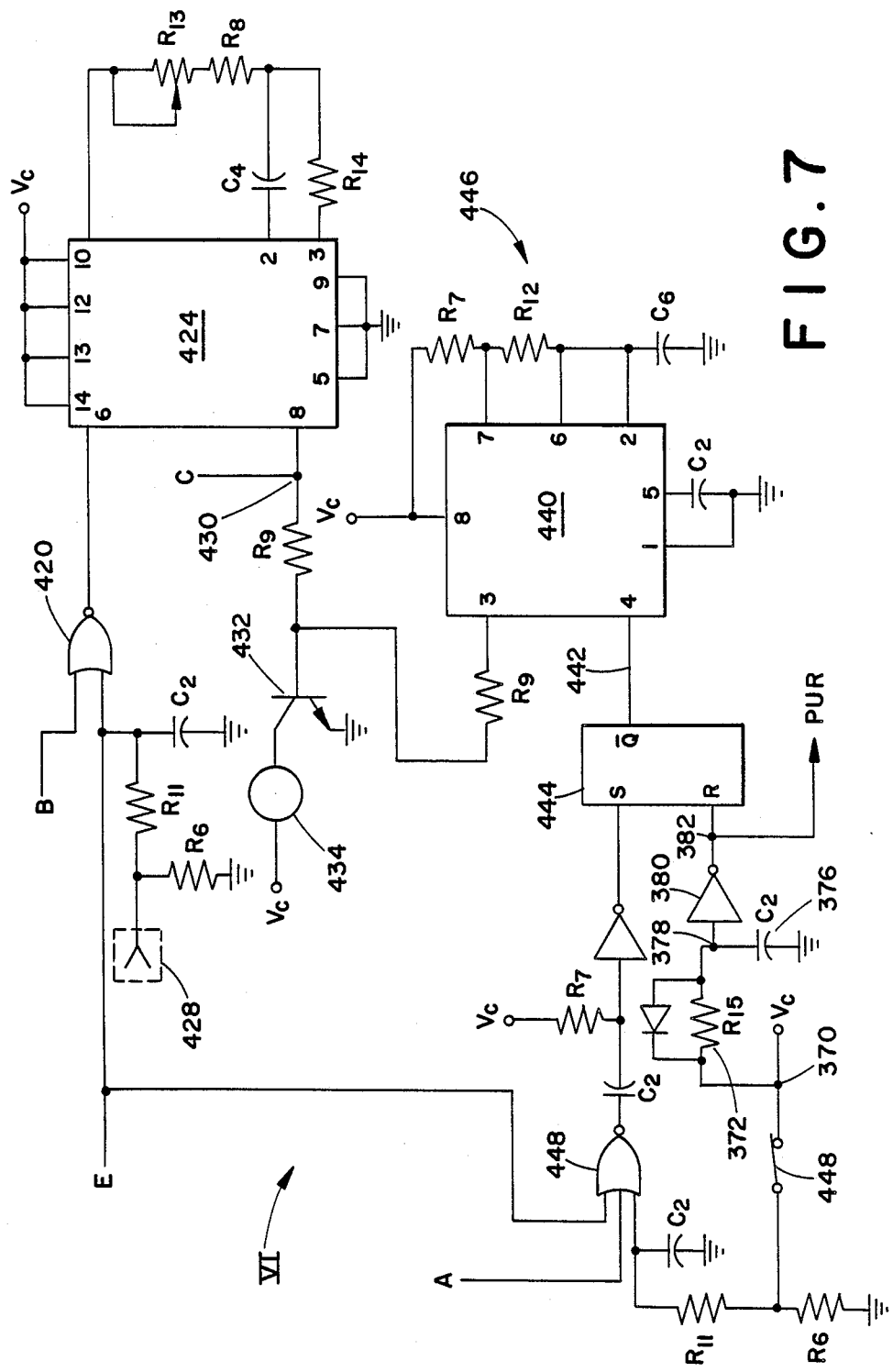
FIG. 7 is a continuation of the schematics of FIGS. 5 and 6.

Turning now to FIGS. 5, 6, and 7, operation of a sequence and timing control VI will be described. Turning particularly to FIG. 7, an apparatus for providing a power up reset signal ("PUR") is provided. Upon commencement of power to the circuit by throwing of switch 294 (FIG. 5) voltage, $V_c$ is present at point 370. A transient voltage is therefore placed across resistor 372 which has diode 374 parallel therewith, and finally through capacitor 376, which is preferably valued at generally 0.1 mfd. Commencement of voltage at 370, thereby would initially place a value of ground level at point 378, with this level rising to $V_c$ as capacitor 376 is charged. An inverter 380 has its input tied to point 378 and its output tied to a power up reset point 382. A signal upon power up is therefore present at point 382 which is high for a short period of time after power up the time for which the signal is high is approximately 0.5 m/sec. to 1 m/sec. After this time a voltage level at 382 is at low or at ground state.

Turning particularly now to FIG. 6, the operation of the control portion of circuit VI will be described. The above-described power up reset pulse forms one input to NOR gate 390. The pulse functions to set an output of NOR gate 390 at its low or ground state. Commencement of power to the circuit also causes a reset input 394 of flip-flop 396, causing 396 to enter its off (Q low) state.

Commencement of a cooking cycle is undertaken by depression of a cycle start switch 400 which is depicted as a normally open push button switch. Depression of the cycle start switch 400 causes the flip-flop 396 to be set, and a corresponding high output to be placed at 402.

Turning to FIG. 5, it will be seen that a high signal at point 402 activates transistor 404, which in turn enables a boil cycle indicator 406, depicted as a light emitting diode. The voltage at 402 further enables the darlington pair control means 302, the operation of which has been described above, thus enabling the heater coil 306. Full power of the heating coil 306 is maintained until a preselected temperature has been reached, and the temperature control signal 316 of FIG. 5 becomes high as described above. At this time, a signal is placed into NOR gate 410, which sets NOR gate 412 and commences operation of a simmer cycle.

A simmer cycle may be commenced, as shown above, by a signal present at point 316. Alternatively, the simmer cycle may be immediately commenced by depression of a simmer control switch 414, which is depicted as a normally open push button switch. Depression of the switch 414 causes a high signal to one additional input of NOR gate 410, hence supplying a signal to force the output of NOR gate 412 to a low state, and correspondingly, the output of NOR gate 390 to its high state. The output of NOR gate 390, when high, activates a transistor 416 which in turn activates a simmer cycle indicator 418 which is shown to by a light emitting diode. The heat level of the heater coil 306 is lowered during the simmer cycle as will be further described below.

When the output of NOR gate 390 goes high, a reset pulse is placed into flip-flop 396 at point 394, thereby causing output 342 of flip-flop 396 to enter its low or off state.

Turning now to FIG. 8, it will be seen that a signal at point 342 forms an input to boil NOR gates 330 and 334. The presence of a high signal at 342 thereby disengages operation of the boil NOR gates and commences operation of the simmer NOR gates.

Returning to FIGS. 6 and 7, it will be seen that when an output at NOR gate 390 become high during a simmer sequence, the corresponding output of NOR gate 412 goes low. Turning specifically to FIG. 7, it will be seen that both outputs to OR gate 420 are low, and hence the output of OR gate 420 become low. The output of OR gate 420 forms an input for a simmer timer integrated circuit 424, the pinouts of which are numbered in accordance with a common programable timer MC 14066 BCP. The presence of a low signal at master reset pin 6, allows the timer 424 to commence tolling. Therefore, while the boiling cycle was activated, a high output was present on flip-flop 412 (FIG. 6) and correspondingly, a high signal was placed at pin 6 of timer 424, thereby maintaining the timer 424 in its reset position until completion of the boiling cycle. A reheat cycle may alternatively be commenced by placing of a voltage signal, $V_c$, at connector point 428. The presence of a signal at this point will momentarily cause the OR gate 420 to have a high signal at the output thereof, thereby resetting timer 424. The simmer time is determined by varying the values of a R/C Network 430.

After completion of the simmer period, a high signal is present at point 430, which is located at pin 8 of timer 424. The signal at point 430 activates transistor 432, which activates an indicator 434, which may comprise an audible signal device. The indicator 434 indicates a completed cooking cycle.

A signal at point 430 also forms an input to alarm beep timer 440, the numbering of which corresponds to a common 555 timer integrated circuit which is wired as an astable multivibrator. Specifically, the signal at 430 is connected to output pin 3 of alarm beep timer 440. As long as a low state is present at voltage point 442 which forms the inverted (Q-bar) output of flip-flop 444, the voltage level at output pin 3 of alarm beep timer 440 will alternate between a high and low state, thereby selectively engaging and disengaging transistor 432 and correspondingly, indicator 434. Therefore, until flip-flop 444 is set, the indicator 434 will continue to be turned on and off as the alarm beep timer 440 is wired in a continuous running mode. The on versus off time for the astable beep timer 440 is dicated by selection of appropriate values of R/C network 446.

The set signal for flip-flop 444 is provided by an output of a three input NOR gate 448, the output of which will be high only when all three inputs thereto are low, as will occur when a reheat signal is not present at connector 128, the cycle start switch is in its open position, and when the pump 286 (FIG. 5) is activated, at which time the switch 448 will be opened.

Turning particularly to FIGS. 6 and 7, the operation of a low power control circuit VII implemented in the simmer cycle will be explained. A low power control timer 460 is comprised of a 555 timer integrated circuit. The low power controller 460 is wired in an astable or free running mode, the on versus off time of which is dictated by an R/C network indicated generally at 462. The low power control 460 is disenabled by the presence of a high signal at the reset pin 4 thereof. The input to the reset pin is provided by a three input NOR gate 462. The output of the NOR gate 462 will be low unless all input lines thereto are in their low or off states. This will occur only when the output at voltage point 430 of simmer timer 424 (FIG. 7) is low, indicating that the simmer cycle has not yet been completed; the flip-flop 412 is in its off state, indicating that the boil cycle has been completed; and the temperature control signal 316 from the monolithic thermocouple amplifier 310 (FIG. 5) is in its low state indicating that the monitored temperature at the thermocouple probe is below the preselected value dictated by an appropriate resistor network 326 and 328, dependent upon whether a regular simmer or cream simmer cycle is selected. When these inputs are all low, the reset to the low power control 460 is disenabled, thereby supplying an alternating high and low signal at pin 3 thereof, as indicated at point 464. The voltage level at voltage point 464 will selectively engage or disengage the darlington pair control means 302, the operation of which has been described above.

It may therefore be seen that during the simmer cycle, the heater coil 306 (FIG. 5) is selectively engaged and disengaged at generally regular intervals dictated by the period of the low power control 460 running as an astable multi-vibrator. This is in addition to the selective engagement dictated by the cycle timing circuit.

Suitable values for the resistors and capacitors of FIGS. 5 through 8 appear in the following table:

| Resistances (ohms) | | Capacitances (microfarads) | |
|---|---|---|---|
| R1 | 6.8 | C1 | 410 pf |
| R2 | 82 | C2 | .01 |
| R3 | 100 | C3 | .1 |
| R4 | 180 | C4 | .2 |
| R5 | 220 | C5 | .22 |
| R6 | 1K | C6 | 4.7 |
| R7 | 10K | C7 | 330 |
| R8 | 12K | | |
| R9 | 22K | | |
| R10 | 36K | | |
| R11 | 100K | | |
| R12 | 150K | | |
| R13 | 250K | | |
| R14 | 270K | | |
| R15 | 560K | | |
| R16 | 20 M | | |

The invention has been described with reference to the preferred embodiment. Obviously modifications and alterations will occur to others upon reading and understanding of the specification. It is intended to include all such modifications and alterations insofar as they come within the scope of the appended claims or the equivalents thereof.

Having thus described the invention, it is now claimed:

1. A cooking apparatus for cooking soup comprising:
    means for defining a selected boiling temperature of the soup;
    means for generating a boiling signal representative of the selected boiling temperature;
    means for defining a selected simmer temperature of the soup;
    means for generating a simmer signal representative of the selected simmer temperature;
    means for monitoring a temperature of the soup;
    means for generating a temperature signal representative of the monitored soup temperature;

a timer means for generating a timing signal indicative of the tolling of a preselected simmer time period;

means for generating a control signal in accordance with the boiling signal, the simmer signal and the temperature signal;

means for selectively controlling application of heat to the soup in accordance with the control signal; and means for terminating the simmer period in accordance with the timing signal.

2. The cooking apparatus of claim 1 further comprising means for varying the simmer time period.

3. The cooking apparatus of claim 1, wherein a simmer period is defined in accordance with the simmer signal and the timing signal.

4. The cooking apparatus of claim 3 wherein the boiling temperature is set to a temperature just below the boiling point thereof.

5. The cooking apparatus of claim 2 further comprising means for defining a holding temperature, means for generating a holding signal indicative of the holding temperature, and means for selectively controlling application of heat to the soup in accordance with the holding signal.

6. The cooking apparatus of claim 3 further comprising a means for commencing operation of a cooking cycle.

7. The cooking apparatus of claim 6 further comprising means for selectively mixing the soup in an associated container.

8. The cooking apparatus of claim 7 wherein said mixing means is comprised of an air pump.

9. The cooking apparatus of claim 8 further comprising means for preheating pumped air prior to exposure to the soup.

10. The cooking apparatus of claim 6 further comprising a means for generating an audible signal after completion of the cooking cycle.

11. The cooking apparatus of claim 10 further comprising means for recommencing the cooking cycle after activation of the audible signal.

12. A cooking apparatus for cooking soup comprising:

means for monitoring a temperature of the soup;

means for generating a temperature signal indicative of a monitored temperature;

means for generating a cooking signal indicative of a cooking temperature;

means for generating a simmer signal indicative of a simmer temperature;

means for generating a timing signal; and means for selectively controlled application of heat to the soup in accordance with the temperature signal, the cooking signal, the simmer signal and the timing signal.

13. The cooking apparatus of claim 12 further comprising means for selectively controlling application of heat to the soup to maintain a generally constant simmer temperature.

14. The cooking apparatus of claim 13 further comprising a means for generating an audible signal in relation to the signals.

* * * * *